May 30, 1939.  F. W. TAYLOR  2,160,181
CYCLE AND LIKE BRAKE
Filed Feb. 28, 1938   2 Sheets-Sheet 1
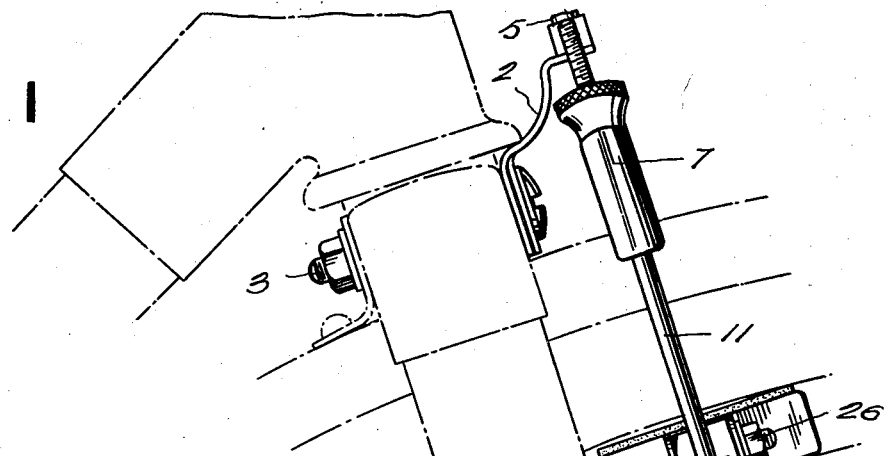
FIG. 1
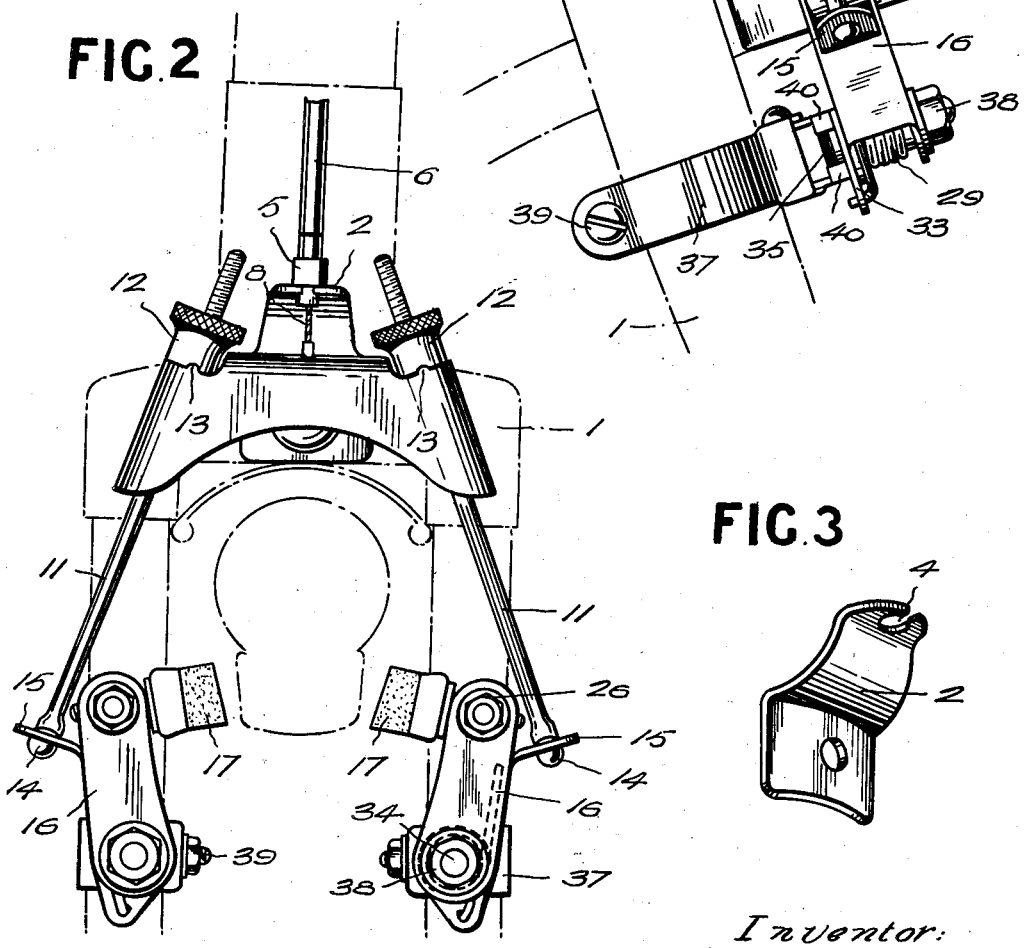
FIG. 2
FIG. 3
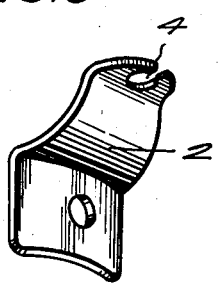
Inventor:
Frank Walter Taylor
By Williams, Bradbury, McCaleb & Hinkle
Attys.

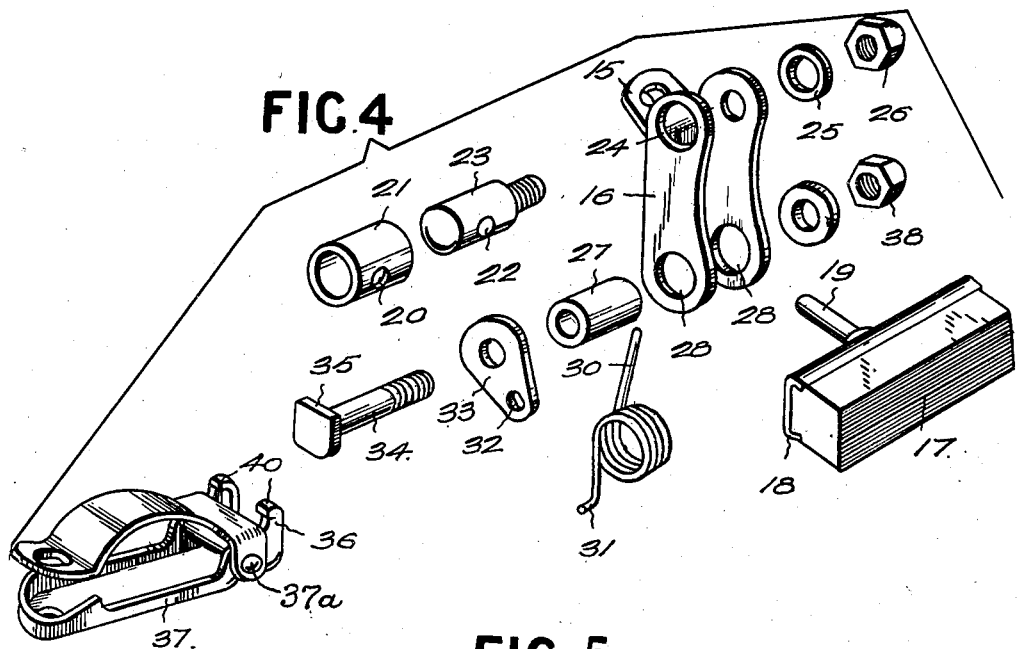
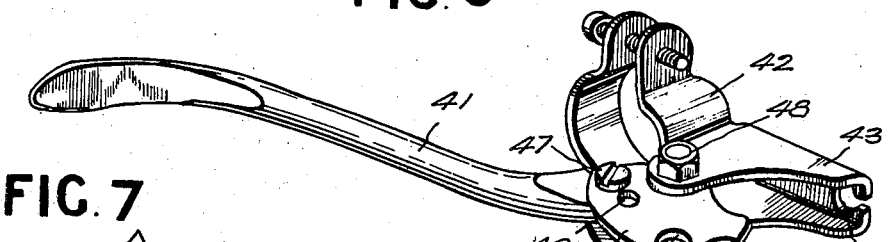
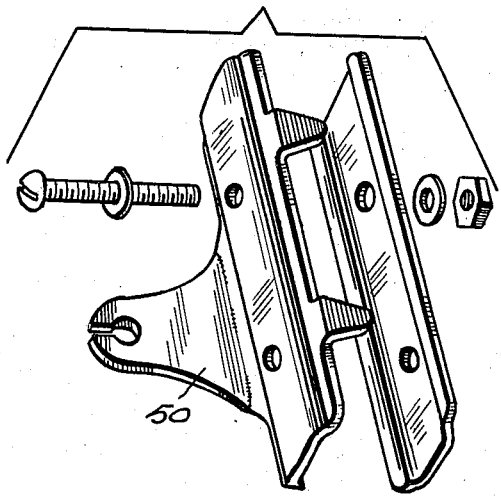
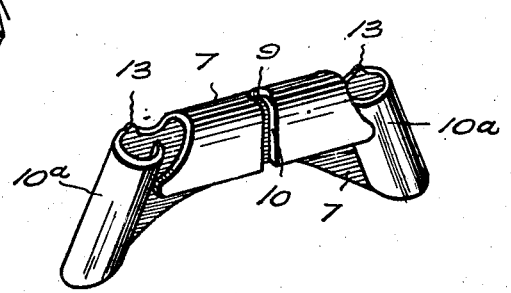

Patented May 30, 1939

2,160,181

UNITED STATES PATENT OFFICE 2,160,181

CYCLE AND LIKE BRAKE

Frank Walter Taylor, Birmingham, England, assignor to H. C. Webb & Co. Ltd., Witton, Birmingham, England, a British company Application February 28, 1938, Serial No. 192,907
In Great Britain November 25, 1936

11 Claims. (Cl. 188—24)

My invention relates to improvements in brakes for cycles and similar machines in which a rim or other part of the wheel is engaged by brake blocks carried on levers and applied by a hand lever through suitable transmission means.

An object of the invention is to mount the brake blocks on the machine close to the wheel and apply them by means of pivoted levers operated simultaneously through pull rods adjustably connected to a floating compensating bar to which the power of the manipulating means is applied.

Another object is to render the adjusting means on the tension rods particularly accessible so that accurate setting of the blocks to the wheel can be readily obtained and maintained by the rider with a minimum of trouble.

A further object is to provide the shoe of each brake block with a pull off spring, the tension of which is likewise readily adjusted.

Another object is to mount the shoe of each brake block in relation to its applying lever so that it can be turned to adjust the block face to the wheel rim, and can be locked in adjusted position.

It is an object to enable the compensating bar to be made as an integral pressing providing shoulders on which the adjusting nuts of the pull rods may bear and an anchorage for the tension member of the applying means by which the bar is pulled to operate the brake block carrying levers.

The construction of the levers which carry and apply the brake blocks as hollow box or trough members with an integral off set part on each for the connection of a pull rod is also an object of the invention.

Other objects and features will appear hereinafter in the claims.

In order that the invention may be better understood it is illustrated by a preferred constructional example in the accompanying drawings:

Figure 1 shows the brake in side elevation fixed to the front fork of a cycle;

Figure 2 shows the brake shown in Figure 1 in front elevation;

Figure 3 is a perspective view of a mounting bracket for a front fork;

Figure 4 shows the separate parts, in perspective, which are assembled together to form the brake block, its pivoted lever and attachment clip;

Figure 5 is a perspective view of a hand lever and its clip for mounting it on the handle bar of a cycle;

Figure 6 is a detail perspective view of a compensating bar seen from the back;

Figure 7 is a perspective view of the parts constituting a mounting bracket for a back brake.

In the drawings, 1 represents the front fork of a cycle, 2 is a mounting bracket, shown in perspective in Figure 3, which is attached to the fork by a bolt 3 and is provided with a hole 4 to receive the nipple 5 of the compression casing 6 of a flexible operating cable.

The compensating bar 7, shown in perspective in Figure 6, is hooked as shown in Figure 2 over the nipple of the tension member 8 of the operating cable which passes through the hole 9. The compensating bar is a sheet steel pressing of hollow bridge shape formed by bending over its upper edge and providing it with a hole 9 and the slot 10 to allow the nipple of the tension member 8 to be slipped into proper relationship to the compensating bar 7 and its hole 9.

The outer edges of the compensating bar are curled over as shown to form the two cylindrical parts 10a adapted to take the operating rods 11. The top edges of these cylindrical parts form the seating for two milled nuts 12 and may be provided with projections 13 which co-operate with notches in the nuts 12 to prevent them running back under vibration. The rods 11 terminate at their lower ends in hemispherical heads 14. Each hemispherical head 14 fits into a hemispherical hole in an extension 15 of one of the pivoted levers 16 which carry the brake blocks 17.

As shown in Figure 4, each lever 16 is of channel section and its extension 15 is formed by slitting the base of its channelled section and cranking the bottom part outwardly. Each brake block 17 is held in a carrier 18 which is provided with a cylindrical stud 19 which fits into the hole 20 in the sleeve 21 and the hole 22 in the bolt member 23 which is inserted inside the sleeve 21, both being slipped into the end of the channel lever through the hole 24 and secured with the washer 25 and nut 26. The tightening of the nut 26 tends to move the member 23 relatively to the sleeve 21 and thus clamps the stud 19 between the edges of the holes 20 and 22.

Each lever 16 pivots about a cylindrical sleeve 27 inserted in the holes 28. A helical pull-off spring 29 is fitted round the sleeve 27 and bears with its end 30 in the base of the lever channel, while its cranked end 31 fits in a hole 32 in an arm 33 which is clamped to the end of the sleeve 27 by means of the bolt 34. The bolt 34 has a squared head 35 which is clipped into the end 36 of a mounting clip 37. The arm 33 and the sleeve 27, together with the lever 16, are then slipped on the bolt and the whole is clamped up by the nut 38.

By altering the position of the arm 33, which is clamped between the end 36 of the clip and the end of the sleeve 27, it is possible to vary the initial stress in the pull-off spring 29.

The mounting clip 37 (see Figure 4) is formed of two pressed metal members pivoted together at 37a. The two members constituting clip 37 can be secured to one another, after slipping them round the fork 2, by means of a nut and bolt 39. (See Figure 1.) The end 36 of the clip 37 is formed by bending up an extension of the bottom part of the clip after it has been slotted to take the bolt 34, its ends being cranked over to form lips 40 for locating the square head 35 of the bolt 34.

A suitable hand lever 41 for operating the brake is shown in Figure 5. It is pivoted to a clip 42 by which it can be attached to the handle bar of the cycle. Clip 42 is provided with a bracket 43 having a hole-and-slot 44 for receiving a suitable nipple (not shown) of the compression casing 6 of the operating cable. A suitable nipple (not shown) of the tension member 8 of the operating cable is slipped into the holes-and-slots 45 of the pivoted quadrant 46 which is secured to the lever by the bolt 47, the lever and quadrant being pivotally carried in the bracket 43 on the bolt 48. An adjustment hole 49 is provided to enable the relative positions of the lever and quadrant to be varied.

Figure 7 shows a perspective view of a mounting bracket 50 for receiving the compression member of the operating cable when the brake is to be mounted on the rear stays of the cycle frame.

The operation of the brake is as follows: When the hand lever 41 is operated the tension member 8 moves relatively to the compression casing 6 and exerts a pull on the centre of the compensating bar. This pull is then applied via the rods 11 to the levers 16 and rocks these to force the brake blocks 17 against the rim. If one brake block engages the rim before the other, the compensating bar rocks over until both blocks are applied to the rim with equal force.

Adjustment of the brake for wear is simply a matter of screwing down the milled nuts 12 above the compensating bar 7 to shorten the effective length of either or both of the rods 11 which connect the bar to the lever 16.

An advantage of the herein disclosed preferred embodiment of my invention is that not only is it simple and efficient, but it is very easily dismantled and re-assembled.

A further advantage is that the usual back plate or frame for the brake is unnecessary, since the end of the compression casing of the operating cable is held by a bracket attached to the crown of the fork or to some other member of the cycle frame and the brake levers are carried on clips. These brackets and clips can be set in any position on the fork plates or other frame members of the cycle to suit the distance of the wheel rim from these members, corresponding adjustment being made in the lengths of the rods or links.

I claim:

1. Cycle and like brake comprising in combination levers carrying brake blocks for operating on opposite sides of a cycle wheel, said levers being pivoted on a part of the cycle and like frame through which the wheel rotates, a floating compensating yoke bar for mounting above the wheel to which yoke bar an operating member is connected, an adjustable pull rod at each end of the compensating yoke bar connecting that bar to an arm on each of said levers, shoes for carrying the brake blocks pivotally mounted on said levers and clampable in any set position, and a torsion spring arranged about the pivot of each lever and means for adjusting said spring.

2. Cycle and like brake comprising in combination levers carrying brake blocks for operating on opposite sides of a cycle wheel, said levers being pivoted on a part of a cycle and like frame through which the wheel rotates, a floating compensating yoke bar for mounting above the wheel to which yoke bar an operating member is connected, an adjustable pull rod at each end of the compensating yoke bar connecting that bar to an arm on each of said levers, shoes for carrying the brake blocks mounted on said levers and clampable in any set position; the levers being pressed as hollow box-like members in which the means for mounting said shoe and clamping means for the shoe is housed at one end and a pull off spring for the shoes at the other end, which is the pivot end of the lever, means for varying the initial stress of said spring being arranged on said lever pivot.

3. Cycle and like brake comprising in combination levers carrying brake blocks for operating on opposite sides of a wheel, each of said levers being of hollow box like construction with a part of one wall bent out to form an offset arm and said levers being pivoted on a part on the cycle or like frame through which the wheel rotates; a floating compensating yoke bar above the wheel to which bar an operating member is connected, and adjustable pull rods arranged between said offset arms on said hollow levers and the respective ends of the compensating yoke bar.

4. Cycle and like brake comprising in combination levers carrying brake blocks for operating on opposite sides of a cycle wheel, said levers being pivoted on a part of the cycle and like frame through which the wheel rotates, a floating compensating yoke bar for mounting above the wheel to which yoke bar an operating member is connected and an adjustable pull rod at each end of the compensating yoke bar connecting that bar to an arm on each of said levers; said floating yoke bar being constructed as an integral metal pressing providing tubular shoulders through which said pull rods pass to receive nuts abutting on the shoulders, and a hooked over part at the neck through which the operating member is anchored.

5. Cycle and like brake comprising in combination levers carrying brake blocks for operating on opposite sides of a cycle wheel, said levers being pivoted on a part of the cycle and like frame through which the wheel rotates, a floating compensating yoke bar for mounting above the wheel to which yoke bar an operating member is connected and an adjustable pull rod at each end of the compensating yoke bar connecting that bar to an arm on each of said levers; said floating yoke bar being constructed as an integral metal pressing providing tubular shoulders through which said pull rods pass to receive nuts abutting on the shoulders, and a hooked over part at the neck through which the operating member is anchored, together with locating projections in said shoulders for engaging complementary parts formed in the nut members.

6. Cycle and like brake comprising in combination brake blocks arranged on opposite sides of a cycle or like wheel and carried by levers pivoted on the machine frame, a torsion spring arranged about the pivot of each lever and means for adjusting the initial stress of said spring; a compensating yoke bar of hollow bridge form with tubular shoulders which is floating relatively to the machine frame but is attached to an operating tension member; a connecting rod between each tubular shoulder of the said compensating bar and the respective lever, which rod extends at one end above the tubular shoulder of the compensating bar and such extension is screwed and receives an adjusting nut seating outside said shoulder by which nut the pull on the bar is transmitted through the rod to the lever.

7. Cycle and like brake comprising in combination brake blocks arranged on opposite sides of a cycle or like wheel and carried by levers pivoted on the machine frame; shoes for carrying the brake blocks mounted on said levers and clampable in any set position; the levers being pressed as hollow members in which the means for mounting said shoes and the clamping means therefor can be housed at one end, while a pull-off spring for the shoes is housed at the other end which is the pivot end of the said levers; a compensating yoke bar which is floating relatively to the machine frame but is attached to an operating tension member; a connecting rod between each end of the compensating bar and the respective lever, which rod extends at one end above a shoulder formed on the compensating bar and such extension is screwed and receives an adjusting nut seating outside said shoulder by which nut the pull on the bar is transmitted through the rod to the lever.

8. Cycle and like brake comprising in combination brake blocks arranged on opposite sides of a cycle or like wheel and carried by levers pivoted on clips on the machine frame, each of said levers being of hollow box-like construction with a part of one wall bent out to form an off-set arm, a compensating yoke bar which is floating relatively to the machine frame but is attached to an operating tension member; a connecting rod between each end of the compensating bar and the off-set arm on the respective hollow lever, which rod extends at one end above a shoulder formed on the compensating bar and such extension is screwed and receives an adjusting nut seating outside said shoulder by which nut the pull on the bar is transmitted through the rod to the lever.

9. Cycle and like brake comprising in combination brake blocks arranged on opposite sides of a cycle or like wheel and carried by levers pivoted on the machine frame, a compensating yoke bar which is floating relatively to the machine frame but is attached to an operating tension member, said floating yoke bar being constructed as an integral metal pressing providing tubular shoulders; a connecting rod connecting each end of the compensating bar to the respective lever, which rod passes through one of said tubular shoulders to receive a nut abutting on the shoulder, by which nut the pull on the bar is transmitted through the rod to the lever, means being provided between said tubular shoulders and said nuts to locate the nuts in adjusted position.

10. A cycle and like brake having brake blocks for operating on opposite sides of the wheel, levers of the third order pivoted on the parts of the cycle and like frame adjacent the wheel to be braked, and carrying the brake blocks, pull rods connected to arms on the levers between the pivot point thereof and braking faces of said brake blocks, the pull rods being connected at their other end to a floating compensating bar of hollow bridge form with tubular shoulders through which the rods pass and to which a brake-applying member is attached and said rods being further adjustable as to their effective length.

11. A cycle and like brake having brake blocks for operating on opposite sides of the wheel, levers carrying the brake blocks pivoted on clips on the cycle and like frame adjacent to the wheel, each lever pivoting about a bolt having a head which can be slipped into and removed from a housing formed on the end of each of said clips, pull rods connecting said levers to a floating compensating bar of hollow bridge form with tubular shoulders through which the rods are passed and to which bar the brake applying means is connected.

FRANK WALTER TAYLOR.